United States Patent [19]

Leonard et al.

[11] 4,069,882

[45] Jan. 24, 1978

[54] SNOWMOBILE DRIVE ASSEMBLY

[75] Inventors: Ronald Keith Leonard; John E. Hoffman, Jr., both of Horicon, Wis.

[73] Assignee: Deere & Company, Moline, Ill.

[21] Appl. No.: 751,655

[22] Filed: Dec. 17, 1976

[51] Int. Cl.² .............................................. B62M 27/00
[52] U.S. Cl. ............................. 180/5 R; 74/230.17 M
[58] Field of Search .................. 180/5 R, 70 R, 64 R; 74/230.17 A, 230.17 M, 230.17 E, 10

[56] References Cited

U.S. PATENT DOCUMENTS

| | | | |
|---|---|---|---|
| 3,776,354 | 12/1973 | Duclo | 180/64 R |
| 4,023,635 | 5/1977 | Teal | 180/5 R |

*Primary Examiner*—Philip Goodman

[57] ABSTRACT

A snowmobile drive assembly includes an engine mounted on a frame by vibration isolation mounts and having an output shaft connected, by means of a flexible coupling, to a first shaft which is rotatably supported on the frame by a first pair of axially spaced bearings. A variable speed primary clutch is mounted on the first shaft between the first pair of bearings and is connected, via a drive belt, to a variable speed secondary clutch mounted on a second shaft disposed parallel to the first shaft and rotatably mounted on the frame by a second pair of bearings.

2 Claims, 3 Drawing Figures

SNOWMOBILE DRIVE ASSEMBLY

BACKGROUND OF THE INVENTION

The present invention relates to a snowmobile drive assembly and more specifically relates to engine and torque converter mounting arrangements for use in a snowmobile.

Heretofore, the most common arrangement of mounting an engine and torque converter on a snowmobile has been to mount the engine on the chassis by vibration isolators, to mount the primary clutch on the output shaft of the engine, to mount the secondary clutch on a shaft rotatably supported on the frame in general parallelism to the output shaft and to interconnect the clutches with a drive belt. The vibration of the engine and its movement as it strains against the vibration isolators during accelerations and decelerations are transferred directly to the primary clutch resulting in unacceptable wear rates in the components of the torque converter and in less than ideal shifting characteristics.

One design offered for overcoming the aforedescribed short comings of the prior art snowmobile drive arrangements is disclosed in U.S. Pat. No. 3,776,354 issued to Duclo et al on Dec. 4, 1973. Specifically, the Duclo et al patent shows the secondary clutch mounted on and adjacent one end of a cross-shaft supported adjacent its one end by a bearing located in a special bracket fixed to the engine, the other end of the cross-shaft being supported in a bearing carried by a chain case bolted to the frame. So that engine vibrations are not delivered to the cross-shaft, a rubber sleeve surrounds the bearing carried by the special bracket. While this patented structure does reduce some of the aforedescribed problems attendant with the prior art designs, the problems are not eliminated since the rubber encased bearing supporting the cross-shaft still permits the latter to move out of parallelism with the output shaft of the engine. Also, for some snowmobile drive arrangements that do not employ a cross-shaft, mounting of the shaft carrying the secondary pulley to a bracket fixed to the engine would be difficult.

SUMMARY OF THE INVENTION

According to the present invention there is provided an improved snowmobile drive arrangement.

An object of the invention is to provide a drive arrangement for a snowmobile wherein engine vibrations and movements are isolated from the torque converter.

A more specific object is to provide a drive arrangement for a snowmobile wherein the engine is mounted on the chassis via vibration isolators and respective shafts carrying the primary and secondary clutches are mounted in fixed parallelism to each other by respective sets of bearings fixed to the chassis.

Yet another object of the invention is to provide a drive arrangement, as set forth in the immediately preceding object, wherein the shaft carrying the primary clutch is substantially axially aligned with the output shaft of the engine and coupled thereto by a flexible coupling for preventing vibrations and movements of the engine from being transferred to the torque converter.

These and other objects will become apparent from a reading of the ensuing description taken with the appended drawings.

DESCRIPTION OF THE PREFERRED EMBODIMENT

Figure 1:
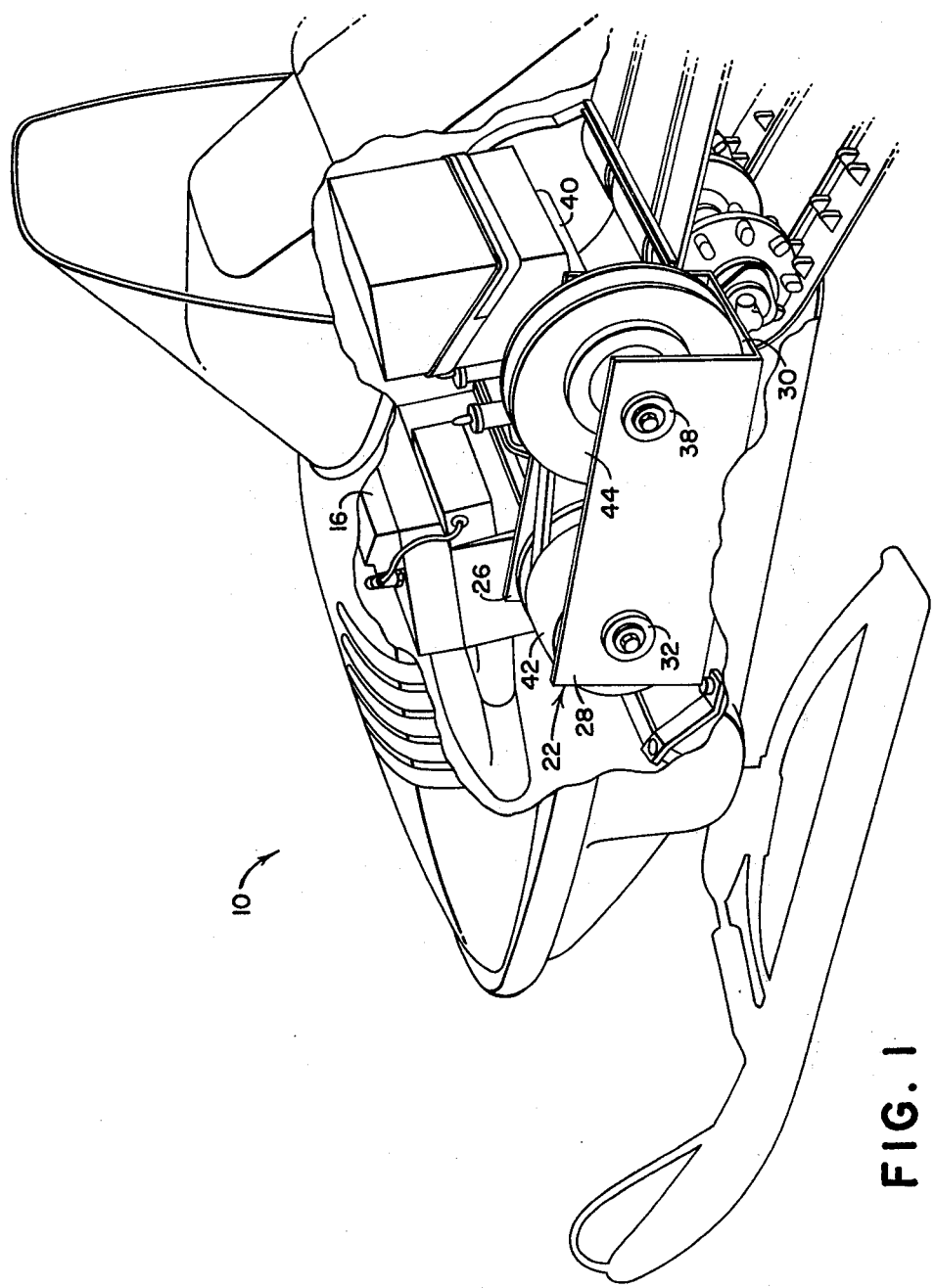
FIG. 1 is a left side elevational view of a front end portion of a snowmobile chassis having an engine and drive components arranged thereon.
Figure 2:
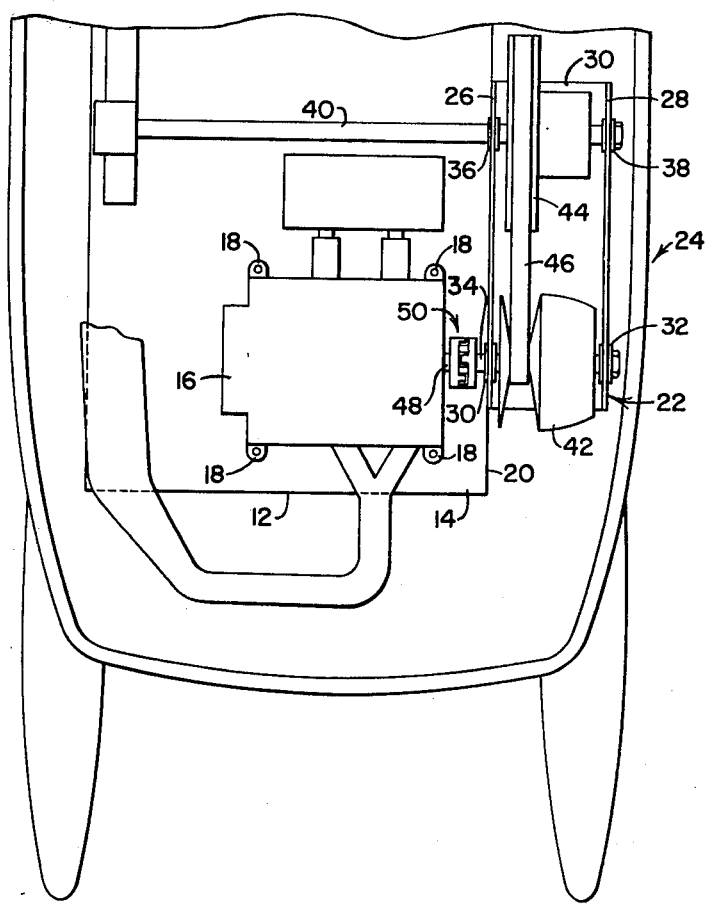
FIG. 2 is a top plan view of the components shown in FIG. 1.

Referring now to the drawing, there is shown a snowmobile 10 having a chassis or frame 12 including a transverse wall 14 defining an upwardly facing mounting surface to which an engine 16 is coupled by means of four mount assemblies 18, two of which are located at the forward side of the engine and two of which are located at the rearward side of the engine. The mount assemblies 18 may be of any known variety having the ability to isolate the chassis 12 from the vibrations of the engine 16. The chassis further includes a vertical longitudinal wall 20 depending from the wall 14 at a location just leftwardly of the engine 16 and bolted or otherwise fixed to the wall 20 in bearing relation to an outward surface portion thereof and, thus in effect forming part of the chassis 12, is a channel shaped sub-frame 22 which serves to support a torque converter indicated generally by reference numeral 24.

Specifically, the sub-frame 22 includes parallel fore-and-aft extending right and left legs 26 and 28 joined by a web 30. A first pair of axially aligned openings respectively in the forward portions of the legs 26 and 28 respectively have bearings 30 and 32 located therein and rotatably supporting a shaft 34. Similarly, a second pair of axially aligned openings respectively in the rearward portions of the legs 26 and 28 respectively have bearings 36 and 38 located therein and supporting a cross-shaft 40 in fixed parallel relationship to the shaft 34. Mounted on the shaft 34 between the bearings 30 and 32 is a variable speed primary clutch 42 and mounted on the shaft 40 between the bearings 36 and 38 is a secondary clutch 44. A drive belt 46 is trained about the clutches 42 and 44.

Figure 3:
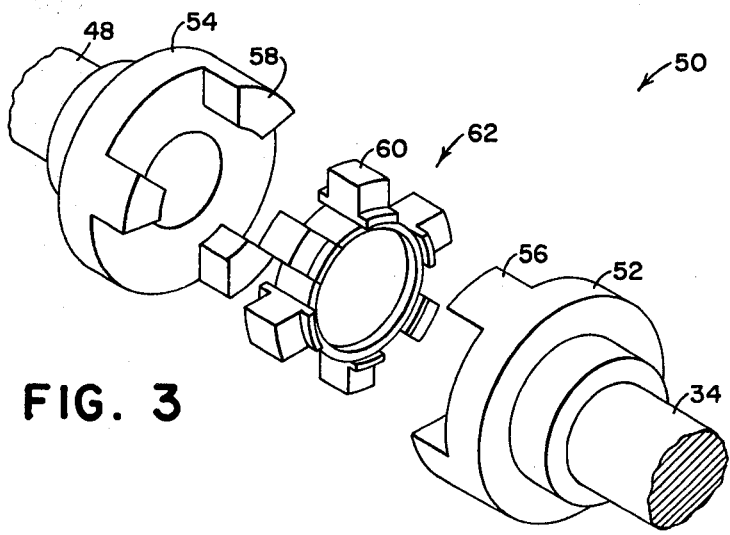
FIG. 3 is an exploded view of the flexible coupling used to connect the engine output shaft to the shaft on which the primary clutch is mounted.

The sub-frame 22 is fixed in place with the shaft 34 located in substantial axial alignment with an output shaft 48 of the engine 16 and a flexible coupling 50 joins adjacent ends of the shafts 34 and 48. As can best be seen in FIG. 3, the coupling 50 includes right and left hubs 52 and 54 provided with splined openings which are respectively received on splined ends of the shafts 48 and 34. The hub 52 includes a plurality of equiangularly spaced leftwardly projecting lugs 56 and the hub 54 includes a similar set of rightwardly projecting lugs 58. Located between the hubs 52 and 54 and having a plurality of radially extending lugs 60 is a spider 62 formed of a firm resilient material capable of absorbing engine vibrations and of flexing for accomodating momentary misalignment of the shafts 34 and 38 due to the engine 16 straining in its mount assemblies 18 during acceleration and deceleration thereof.

Thus, during operation, it will be appreciated that the engine 16 will vibrate and move relative to the chassis 12 as permitted by the mount assemblies 18, and that the torque converter components will remain in fixed relationship to each other and the chassis 12. The movement of the output shaft 48 of the engine 16 is accomodated by the flexible coupling 50 which also serves to absorb engine vibrations. Since the torque converter components always remain fixed relative to each other, no misalignment occurs between the clutches 42 and 44 which would effect undue belt wear or clutch wear. Also, since the line of centers between the clutches 42 and 44 does not change, the shift characteristics of the torque converter are uniform and predictable according to the construction of the clutches 42 and 44.

We claim:

1. A snowmobile drive assembly, comprising: a support frame; a prime mover having a drive shaft; vibration isolation mounts connecting the prime mover to the frame; first and second parallel shaft means; first and second bearing means respectively rotatably supporting the first and second shaft means on the frame with the first shaft means substantially axially aligned with the drive shaft; variable speed primary and secondary clutches respectively mounted on the first and second shaft means; a drive belt trained about and establishing a driving connection between the clutches; and flexible coupling means including torsional damping means connecting the drive shaft with the first shift means.

2. In a snowmobile drive assembly including an engine mounted on a support frame by vibration isolation mounts and having a drive shaft drivingly connected to a variable speed primary clutch which is in turn drivingly connected, by means of a drive belt, to a variable speed secondary clutch mounted on an output shaft rotatably supported on the support frame in substantial parallel relationship to the drive shaft, the improvement comprising: said drive shaft including a first section emanating from the engine and a second section separate from the first section; said primary clutch being mounted entirely on the second section; bearing means rotatably supporting the second section on the frame; and flexible coupling means including torsional damping means connecting the first and second shaft sections to each other.

* * * * *